Feb. 1, 1927.

G. E. WIGHT 1,615,859

APPARATUS FOR USE IN THE LAYING OF BRICKS AND SIMILAR
ELEMENTS IN BUILDING

Filed Oct. 31, 1925   6 Sheets-Sheet 1

Inventor:

GEORGE EDWARD WIGHT.

Attorney:

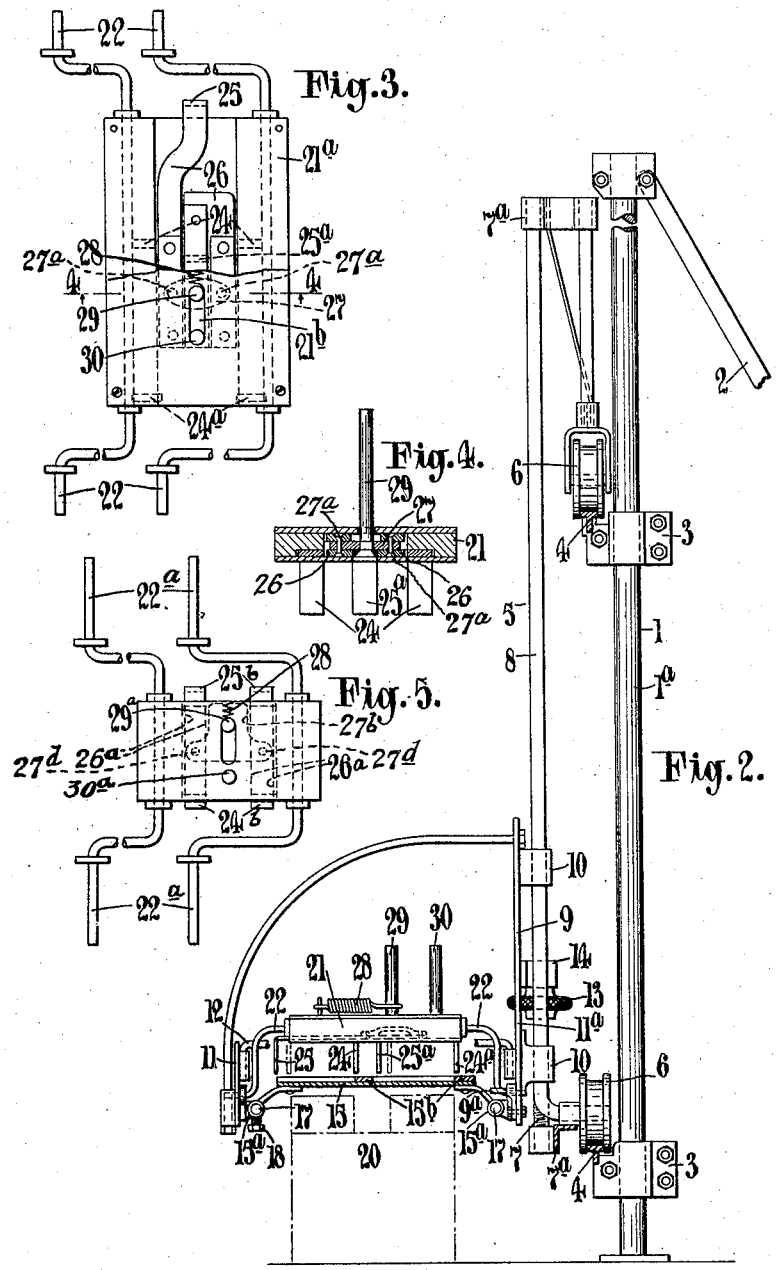

Feb. 1, 1927. 1,615,859
G. E. WIGHT
APPARATUS FOR USE IN THE LAYING OF BRICKS AND SIMILAR
ELEMENTS IN BUILDING
Filed Oct. 31, 1925   6 Sheets-Sheet 3
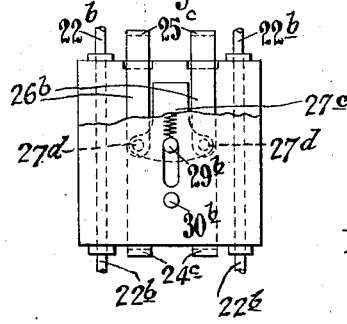
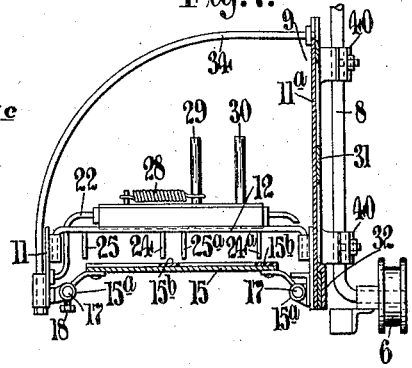
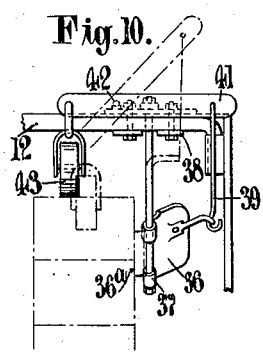
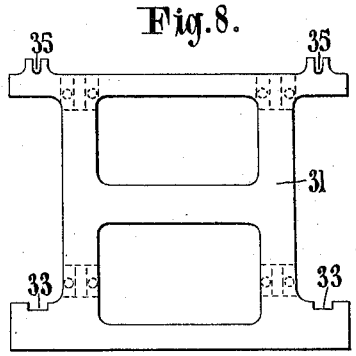
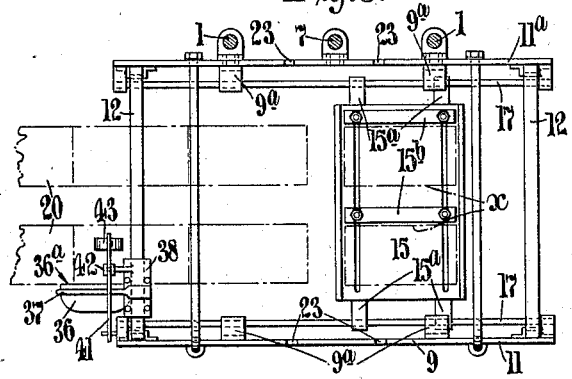
Inventor:
GEORGE EDWARD WIGHT.
Attorney:

Feb. 1, 1927.
G. E. WIGHT
1,615,859
APPARATUS FOR USE IN THE LAYING OF BRICKS AND SIMILAR
ELEMENTS IN BUILDING
Filed Oct. 31, 1925     6 Sheets-Sheet 4
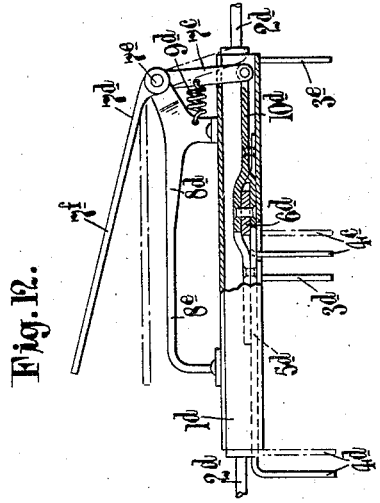
Inventor:
GEORGE EDWARD WIGHT.
Attorney:

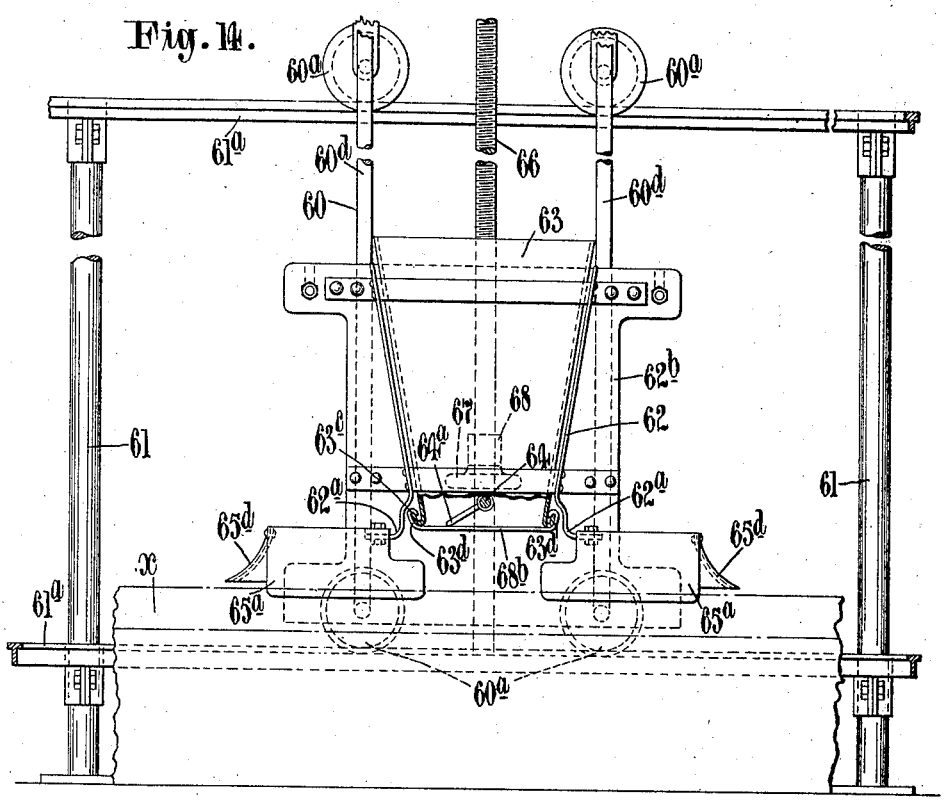
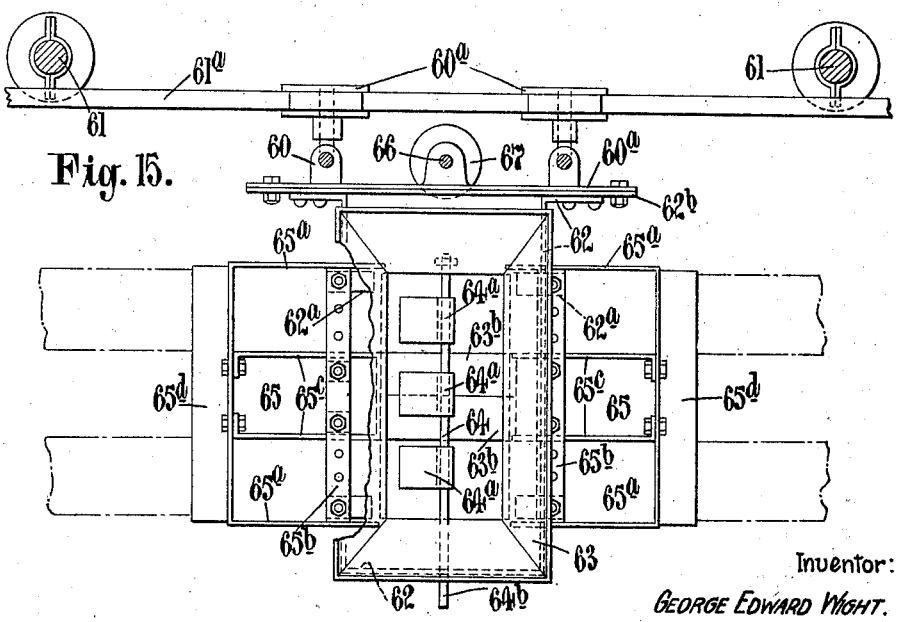

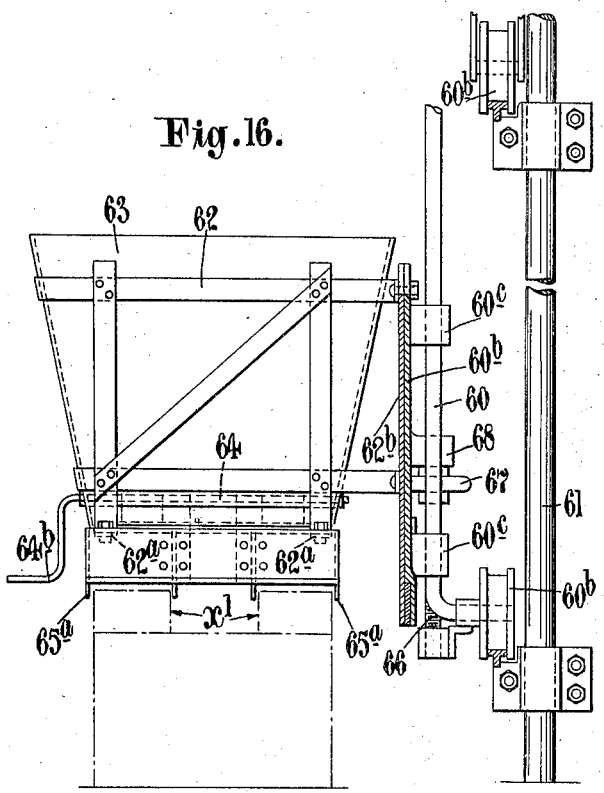
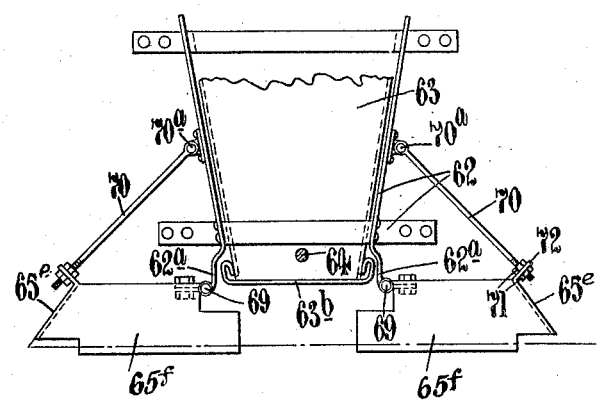

Patented Feb. 1, 1927.

1,615,859

UNITED STATES PATENT OFFICE.

GEORGE EDWARD WIGHT, OF SEAHAM HARBOUR, ENGLAND.

APPARATUS FOR USE IN THE LAYING OF BRICKS AND SIMILAR ELEMENTS IN BUILDING.

Application filed October 31, 1925, Serial No. 66,046, and in Great Britain November 14, 1924.

The invention relates to apparatus adapted to facilitate the laying of bricks and similar building elements (hereinafter referred to as "bricks") in building, so that walls may be built more expeditiously than heretofore and without skilled labour, while ensuring perpendicularly of the wall, the apparatus being of the kind comprising a temporary framework embodying a horizontal track on which is mounted for travelling movement a carriage carrying a bricklaying apparatus in the form of a transfer device for conveying the bricks from an initial support to their final position, the carriage travelling parallel with the face of the wall to be built and the bricks being laid by the transfer device as the carriage is moved along the track.

An object of the present invention is to provide an efficient apparatus for this purpose which may be readily erected for operation on the building site and which may be manually operated without skilled labour, and primarily comprises a novel form of transfer device designed to enable the bricks to be manually laid in a simple and accurate manner, said transfer device comprising a body portion movable between the initial and depositing positions and presenting a fixed abutment and a cooperating arm or arms manually movable towards and away from said abutment to engage and subsequently release one or more bricks, the movable arms being adapted to be manually moved to engage the bricks in their initial position prior to transfer and to be released at the depositing position to disengage the brick or bricks.

The invention further consists in an arrangement whereby the transfer device may be readily raised after the completion of each course without interference of the framework, the transfer device being for this purpose carried by a frame which is so connected to the carriage as to be adjustable in height relatively to said carriage.

The invention further comprises a scraper device for automatically removing superfluous mortar from the face of the wall during the travelling movement of the carriage, and applying the mortar removed to the bricks last laid for the succeeding joint.

The invention also comprises a device for laying mortar on the bricks comprising a hopper adapted to travel on a brick over the course on which the mortar is to be laid, said hopper discharging the mortar onto the course during its travel.

Further features of the invention are described hereinafter and specifically pointed out in the appended claims.

In building with the apparatus, the carriage is moved stepwise along the track as the course is being laid, that is to say, after each depositing operation of the transfer device, and the frame is raised after the completion of each course to bring the transfer device into position for the laying of the succeeding course, while the carriage itself may be lifted from time to time as the wall increases in height beyond the limit of vertical adjustment of the frame, the framework having for this purpose superimposed rails for supporting the carriage at different levels.

Embodiments of the invention are illustrated in accompanying drawings, in which:—

Fig. 2 is a side view of the same.

Fig. 3 is a plan view to a larger scale of one form of transfer device adapted to lay the bricks in pairs in building a double wall.

Fig. 4 is a section on the line 4—4 of Fig. 3.

Figs. 5 and 6 show in plan two modified forms of a transfer device.

Fig. 7 shows a side elevation of a modified form of carriage.

Fig. 8 is a face view of a part of the carriage shown in Fig. 7.

Fig. 9 is a plan view of the frame with the transfer device removed.

Fig. 10 is an enlarged side view of the scraper device, and

Fig. 11 shows a modified form of apparatus.

Fig. 12 is a side view partly in section of a modification of the transfer device.

Fig. 13 is a plan view of Fig. 12.

Fig. 14 is a side elevation of the mortar laying device hereinbefore mentioned.

Fig. 15 is a plan view of Fig. 14.

Fig. 16 is an end view of Fig. 14 and Fig. 17 shows in side elevation an arrangement whereby a spatula device for spreading the mortar may be adjusted in height independently of the hopper.

Figure 1:
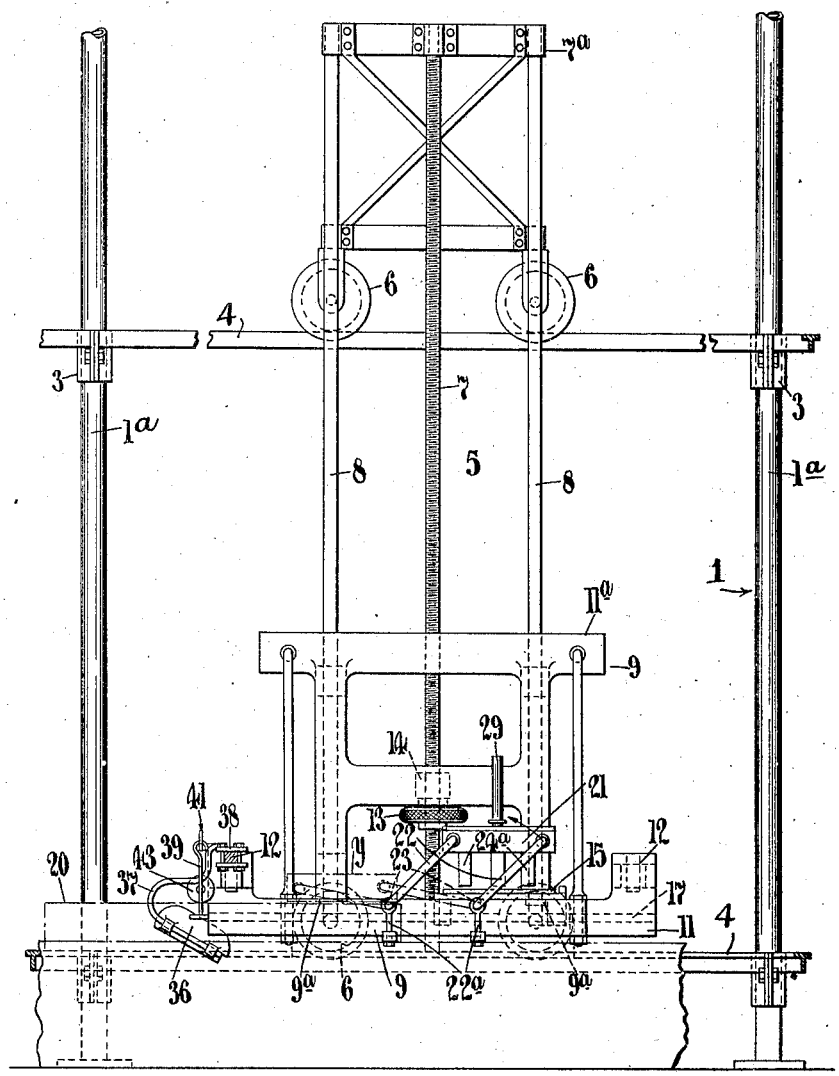
Fig. 1 is a front elevation of the apparatus showing the same in operative position.

Referring to Figs. 1 to 4 of the drawings, 1 designates the frame work by which the apparatus is supported in position for building, said framework comprising a series of upright posts or columns 1a secured in the ground at suitable intervals in any desirable manner and supported with the aid of stays 2. Only two posts 1a are shown, but obviously there may be any number according to the length of the wall to be built. Mounted for sliding adjustment on the posts 1a are clamp brackets 3 which serve to carry in detachable manner superimposed rails 4. Mounted for travelling movement on the rails 4 is the carriage 5 having wheels 6 running on the rails 4 and comprising a vertical screwed rod 7 and guide rods 8 connected at their ends by cross members 7a.

Mounted for vertical sliding movement on the guide rods 8 is a frame 9, the latter presenting lugs 10 embracing the rods 8. The frame 9 which comprises longitudinal members 11, 11a united by cross members 12, is adjustable in height on the rods 8 by means of a tapped hand wheel 13 on the rod 7, said wheel 13 engaging under a lug 14 on the frame so that by rotating the wheel 13 the frame may be raised or lowered as required.

The numeral 15 designates the tray on which the bricks are placed by hand and from which they are transferred by the transfer device 21 to their final position. The tray is slidably supported on guide rods 17 carried by the frame 9, lugs 15a on the tray embracing said rods 17, so that the tray may be adjusted to the desired position by sliding it along the rods 17, while the frame is held in the adjusted position by a set screw 18 on one of the lugs 15a. Guidance for positioning the bricks on the tray is afforded by adjustable bars 15b, there being two such bars illustrated to position two bricks, the apparatus shown in Figs. 1 and 2 being equipped with a tray and transfer device adapted for building a hollow wall. The transfer device is accordingly designed to pick up from the tray 15 and lay two bricks at a time, the bricks being held by the transfer device the requisite distance apart according to the desired space between the walls. In Figs. 2 and 9, 20 designates the bottom courses of such a double wall. The transfer device comprises a body portion 21a carried by a pair of cranks 22 which are rotatable in said body portion 21a and supported at their ends in slots 23 in the frame members 11, 11a in which slots the crank ends are detachably secured as by bolts 22a.

Depending from the underside of the body portion of the transfer device are fixed arms 24, 24a with which cooperate similarly depending but movable arms 25, 25a projecting downwards from slides 26 guided for rectilinear movement in the body portion 21a and connected by a swivel link 27 (Figs. 3 and 4). The link 27 is pivotally connected at opposite ends at 27a to the slides 26 and is free to slide with the latter, so that limited relative movement of the arms 25, 25a is permitted, sufficient lateral play of the slides in the body 21a being provided to allow of rocking movement of the link 27. The arms 25, 25a are adapted to be manually moved from the outer position indicated by full lines to an inner position shown by broken lines in Fig. 2, i. e. towards the fixed arms 24, 24a, so that the bricks on the tray are gripped between the movable and fixed arms, such movement being effected by a handle bar 29 working in a slot 21b in the detachable cover of the body and rotatably secured to the link 27 between the pivot pins 27a, compensated movement of the arms 25, 25a to allow for inequality in the dimensions of bricks being thus provided by the link connection described. A fixed post 30 on the cover of the body portion serves as a point of purchase for the hand in moving the operating handle 29, the latter being drawn by the hand towards the post 30 to grip the bricks. The arms 25, 25a are normally held in their outer or disengaging position by a spring 28. The arms 24, 24a may be adjustably secured to the body of the transfer device so that they may be set for any desired distance between the two walls.

Stops 9a are provided on the frame 9 for the cranks 22, to limit the swinging movement of the transfer device.

Various forms of transfer devices are provided according to the nature of the wall to be built, for instance, Fig. 5 shows such a device adapted to transfer one brick only at a time, 25b designating a pair of sliding arms and 24b a pair of fixed arms, the slides 26a from which the arms 25b depend being pivotally connected at 27 to a link 30 slidable in the body of the device and carrying the handle 29a manipulated with the assistance of the fixed post 30a as hereinbefore described with reference to the first transfer device. Fig. 6 shows a further modification which differs only from the construction shown in Fig. 5 by the fixed and moving arms 24c and 25c respectively being further apart so that two bricks disposed side by side either as headers or stretchers may be picked up and transferred for certain classes of brickwork. The slides 26b from which the movable arms 25c depend are connected by a swivel link 27c actuated in a similar manner to the previously described constructions by means of a handle 29b rotatably connected to the link and cooperating with the fixed post 30b.

Any of the transfer devices may be fitted to the frame, or the frame may be designed for detachable connection to the carriage 5 so that it may be readily removed when necessary, and several of such frames each carrying a different form of transfer device for various classes of brickwork may be provided for alternative use on the carriage. A suitable connection is shown in Figs. 7 and 8, wherein the rear frame member 11ª is detachably connected to a back plate 31 slidably mounted on the rods 8, the connection being effected by providing the member 11ª with forked parts 32 which engage over the lower part of the plate 31 and fit in slots 33 in the latter, while at the top, rods 34 connecting the frame members 11, 11ª engage at their upper ends on slots 35 in the plate 31 and are secured by nuts, as shown in Fig. 7.

As an alternative to the screw 7 and nut 13 for adjustment of the frame 9, the latter may be raised or lowered by hand and secured in position by split clamping lugs 40 as indicated in Fig. 7.

The means for scraping superfluous mortar from the joint as the work proceeds comprises a scraper plate 36 hinged to a bar 37 detachably secured by a clamp 38 to a suitable part of the frame 9, such as one of the cross members 12. The plate 36 is arranged to lie at an angle to the horizontal and is pivotally connected by a link 39 to one end of a lever 41 pivoted at 42 to the clamp 38, while the other end of the lever has suspended from it a roller 43 adapted to roll on the top of the course being laid, the arrangement being such that the lever 41 under the influence of the weight of the roller has the tendency to tilt to the position indicated by broken lines, and thereby draws the scraping edge 36ª of the plate 36 clear of the wall face, the lever, however, when relieved of the weight of the roller, i. e. with the latter resting on the top course, tends to tilt in the opposite direction, so that the scraper plate 36 scrapes against the face of the wall over the joints so that it removes and supports the superfluous mortar when the carriage is moved periodically along the course as the bricks are laid, and on the other hand the mortar collected on the scraper plate may be deposited on the end of the brick last laid by return movement of the carriage. Two or more of such scraping devices may be provided if required to act on both faces of the wall or walls.

Briefly stated, the operation of the apparatus for the building of a double wall is as follows: A pair of bricks are laid by hand on the tray 15 as indicated at X (Fig. 9) the bars 15ᵇ acting as a gauge for positioning the bricks. The frame 5 is adjusted to the correct height and the transfer device is thereupon swung by the operator over to the position shown in Fig. 1, i. e. over the tray 15, and the bricks are engaged by the arms 24, 24ª, 25, 25ª by manually drawing the handle 29 towards the post 30. The transfer device is thereupon swung over in the opposite direction to the position indicated by y, Fig. 1, and the handle 29 released so that the pair of bricks are deposited in correct position. The carriage is then moved the requisite distance along the rails, the transfer device swung back again over the tray and the operation repeated until the course is completed, mortar being of course applied in the ordinary way. The frame is then raised to bring it into alignment for the next course to be laid, guidance for such vertical adjustment being afforded by the stops 9ª on the frame as follows: A brick or a gauge block is placed on the last course and beneath one of the stops 9ª, and the frame after preliminary raising is lowered until the stop 9ª, rests on the brick or gauge block. The frame is thus correctly adjusted for the laying of the next course. As the wall increases in height beyond the scope of adjustment of the frame 5, the carriage is lifted onto the next pair of rails 4 above, there being a number of such rails commensurate with the height of the wall to be built.

The wall may be built from left to right or vice versa, the tray 15 being adjusted accordingly on the guides 17.

Referring to Fig. 11, for building thick walls exceeding two bricks in width there is advantageously used duplicate temporary frameworks designated 1ᵇ, disposed one on each side of the site on which the wall is to be built, and each supporting a pair of superimposed rails 4ª, 4ª. The carriage 5 in this case is designed to be supported on opposite sides by the rails 4ª, 4ª. One side of the carriage is similar to the carriage shown in Figs. 1 and 2, comprising guide rods 8ᵇ, a screwed rod 7 with adjusting wheel 13, and wheels 6ª running on the rails 4ª, and this portion of the carriage is connected at the top by cross ties 50 to a similar structure opposite, comprising guide rods 8ᶜ and wheels 6ᵇ running on the rails 4ª.

The frame 9ª is in this case connected at opposite sides to the rods 8ᵇ, 8ᶜ for vertical sliding movement, the frame sides 11ᵇ having lugs 10ª, 10ᵇ embracing with a sliding fit the rods 8ᵇ, 8ᶜ respectively. This frame may be adjusted in height by the hand wheel 13 on screwed rod 7 similarly to the frame previously described with reference to Figs. 1 and 2, while the frame 9ª is adapted to be clamped in the adjusted position by the lugs 10ᵇ which are of the split type. With such a frame construction a transfer device is advantageously used which is arranged for sliding movement on the cranks 22ᶜ, as shown in Fig. 11, said cranks passing through the body of the transfer device and the latter being a sliding fit on the cranks so that several rows of bricks may be laid successively to form a course, the transfer device being moved laterally, i. e.

transversely to its transfer movement, after the laying of each row of bricks. Adjustable clamp sleeves 53 secured to the crank 22$^c$ by set screws 53$^a$ serve to hold the transfer device in its adjusted position.

In Fig. 11 a transfer device is shown which is similar in construction to that shown in Fig. 5 and adapted to deal with one brick at a time, but obviously one adapted to transfer two bricks as shown in Fig. 6, may be similarly arranged for lateral movement on the crank. 24$^d$ designates the fixed arms and 25$^d$ the movable arms depending from the slide 26$^c$ of the transfer device the movable arms being operated with the aid of the handle 29$^d$ and fixed post 30$^d$.

The modification shown in Figs. 12 and 13 concerns the transfer device and more particularly the hand actuated means thereof for operating the arms to engage the bricks and for moving the transfer device from its picking up to its depositing position and vice versa, The object is to provide improved hand actuated means for the transfer device so that the actuation of the arms and the transfer movement of said device may be more conveniently and effectively accomplished, there being used in lieu of the sliding handle and fixed post previously described a lever arrangement consisting of a hand lever pivotally mounted on the transfer device and pivotally connected to the swivel link to which the movable brick-engaging arms are connected, said hand lever being associated with an adjacent grip member acting as a point of purchase for the hand in operating the lever.

The transfer device shown is adapted to deal with two bricks at a time and comprises essentially the body portion or casing 1$^d$ carried for transfer movement by pairs of cranks 2$^d$ by which the device is swung from its picking up to its depositing position and vice versa. Depending from the underside of the body 1$^d$ are the fixed arms or abutments 3$^d$, 3$^e$ with which cooperate similarly depending but movable arms 4$^d$, 4$^e$, projecting downwards from slides 5$^d$ guided for rectilinear movement in the casing 1$^d$ and pivotally connected 6$^c$ by a compensating swivel link 6$^d$. The arms 4$^d$, 4$^e$ are adapted to be manually moved from the outer position indicated by full lines to an inner position shown by broken lines, i. e. towards the fixed arms or abutments 3$^d$, 3$^e$ so that a pair of bricks or other building elements disposed between said arms on a support member are gripped between the movable and fixed arms. The transfer device is then swung over to the depositing position. According to the invention the actuation of the link 6$^d$ to move the arms 4$^d$, 4$^e$ is effected by means of the lever device shown which comprises a lever 7$^d$ pivoted at 7$^e$ to a bracket 8$^d$ secured to the top of the casing 1$^d$ one arm 7$^f$ of said lever forming the handle and the other arm 7$^e$ projecting through a slot in the top of the casing 1$^d$ and pivotally connected by the connecting bar 10$^d$ to the aforesaid link 6$^d$. The bracket embodies the grip bar 8$^e$.

The hand lever is normally held in an inclined raised position as shown, as by means of a spring 9$^d$, the arms 4$^d$, 4$^e$ being in their outer position. To move the arms to engage the bricks the handle is forced downwards by hand, using the bar 8$^e$ as a grip, so that the arms are moved thereby to engaging position through the link 6$^d$ and slides 5$^d$. When released, the handle is automatically returned to normal position by the spring 9$^d$ and thereby returns the arms to inoperative position.

The device in addition to providing a convenient means of operating the movable arms 4$^d$, 4$^e$ also affords a convenient handle for moving the transfer device between its picking up and depositing positions.

Obviously the same device is applicable to the alternative forms of transfer devices as described hereinbefore for engaging one building element only.

To now refer to the mortar laying or applying device illustrated in Figs. 14 to 17 this comprises a travelling hopper having a spatula or spreading device adjacent one or both sides of the lower end of the hopper for the purpose of spreading the mortar deposited on the course by the hopper, said spatula device being adjustable in height so that the depth of the layer of mortar may be varied according to requirements. The hopper may also embody trimming devices for finishing off the edges of the layer of mortar flush with the sides of the course on which it is laid. The hopper is mounted on a carriage for adjustment in height relatively to said carriage so that it may be adjusted according to the desired thickness of the layer of mortar and so that it may be raised for successive courses as the wall is erected, while the hopper is detachably connected to the carriage so that it may be replaced by the bricklaying apparatus hereinbefore described.

Means are also provided whereby the outlet orifice of the hopper may be adjusted to suit the particular kind of wall in connection with which the mortar is to be laid, for example, the hopper may be provided with a removable base comprising a plurality of removable sections of varying width which are adapted to be positioned so that the mortar is deposited in one or more streams of a width or widths corresponding with the kind of wall to be built.

Means may also be provided for assisting the flow of the mortar from the hopper, such means comprising a central shaft mounted inside the hopper at its lower end, preferably just above the outlet, and paddles or the like rigidly attached to said shaft, and having a rocking movement through the upper portion of a circle, so that the mortar is brought down to the discharge orifice and assisted out of the hopper, while means are provided for rocking said shaft.

Referring more particularly to Figs. 14 to 16, 60 indicates a carriage having pairs of superimposed wheels $60^a$ running on rail tracks $61^a$ carried by a scaffolding structure 61 which is temporarily erected at the side of the wall $x$ to be built, said carriage and scaffolding structure being similar to those shown in Figs. 1 and 2 of the drawings. Detachably mounted on a frame portion $60^b$ of the carriage is an open-topped frame or basket 62 which forms a holder for the hopper 63 in such a manner that the said hopper may be readily introduced from above into the basket and lifted away from the latter. The lower edges of the sides of the hopper which are transverse of the wall to be built, are turned up as shown at $63^d$ in Fig. 14 to form slides for sliding plate members $63^b$, the latter having turned over edges $63^c$ which engage over the edges $63^d$. The members $63^b$ are adapted to enable the outlet orifice of the hopper to be varied according to the kind of wall to be built. The drawing shows an ordinary hollow wall being built, and two members $63^b$ are positioned together so as to close the hopper outlet over the space $x^1$, between the two brick courses. In every case the members $63^b$ are used for preventing deposit of mortar where it is not required. For example, in the case of a yard wall, say nine inches thick, the members $63^b$ would be arranged so as to form a single orifice as wide as the length of a single brick.

A shaft 64 is arranged centrally along the lower portion of the hopper 63 and has paddles $64^a$ rigidly mounted thereon, a handle $64^b$ being provided at one end of the said shaft. The paddles are adapted to be rocked to and fro by means of the handle $64^b$ for the purpose of bringing the mortar down to the discharge orifice of the hopper, said paddles rocking through an arc from the position shown in full lines to that indicated by broken lines, and vice versa as shown in Fig. 14.

On extensions $62^a$ of the basket 62 there are detachably mounted mortar guides 65 comprising side members $65^a$ secured to longitudinal bar $65^b$ detachably fastened to the extensions $62^a$. The said side members $65^a$ project slightly below the top of the course of the bricks on which the mortar is to be laid, and serve to remove surplus mortar so as to make the sides of the layer flush with the bricks. Similar members $65^c$ are provided on the inside of the hollow walls, these members projecting similarly below the inner brick faces.

The ends of the guides 65 remote from the hopper are inclined as shown at $65^d$ so as to form a spatula device to ensure the smooth laying of the mortar as the carriage is moved along the course.

For walls of varying thickness, or for different kinds of walls the members $65^a$ may be made adjustable along the bar $65^b$, or different guides of fixed construction may be provided, any one of which may be detachably fastened to the extensions $62^a$.

It will be observed that two mortar guides are provided, one at each side of the hopper 63. This allows the apparatus to be used in either direction, one only of the guides functioning at a time. One guide only may be provided if desired, but in such a case the carriage will require to be brought back again for every laying operation.

The operation of the machine is as follows:—The carriage 60 is moved along to the end of the course on which mortar is to be laid, and the hopper 63 filled with mortar. The carriage is then moved along the course, the handle $64^b$ meanwhile being rocked to and fro so as to assist the mortar out of the hopper. As the carriage continues its travel one of the guides passing over the mortar trims the latter at the sides, the mortar being then levelled off by one of the spatulas $65^d$. Preferably a whole course has mortar applied in one operation, after which the basket 62 is removed and the bricklaying apparatus previously described is substituted therefor. It should be observed in this connection that the back plate $62^b$ of the basket 62 which is attached to the frame plate $60^b$ of the carriage 60 is similar to the corresponding frame member of one form of the bricklaying apparatus, so that the two devices are quickly interchangeable.

The adjusting means shown for varying the height of the basket and thereby the hopper is the screwed spindle 66 and hand wheel 67 corresponding to the screwed rod 7 and hand wheel 13 previously described. Briefly stated the spindle 66 is secured at the top and bottom to the frame of the carriage 60; the hand-wheel 67 is in screwed engagement with said spindle 66 and engages the underside of a lug 68 fixed to the back plate $60^b$ of the frame. The plate $60^b$ has lugs $60^c$ which are slidable on vertical rods $60^d$ which form a part of the carriage 60 and carry the wheels $60^a$. Thus, by turning the hand-wheel 67 the plate $60^b$ and consequently the hopper 63 with spatulas $65^d$ may be adjusted in height according to the required thickness of the layer of mortar and the hopper may also be raised for each successive course.

The screwed spindle and hand-wheel may be dispensed with and the alternative arrangement described with reference to Fig. 7 embodying the split clamping lugs 40 used instead.

As an alternative to adjusting the spatulas by means of the hand-wheel 67 they may be adjusted independently of the hopper and frame therefor. Such an alternative adjustment is shown in Fig. 17 wherein the mortar guide 65 carrying the spatula plate 65$^e$ with side members 65$^f$ is hinged at its rear end at 69 to the basket extension 62$^a$ and at the front end the member 65 is supported by stay rods 70, the latter being hinged at their upper ends at 70$^a$ to the frame 62 and connected at their opposite ends by nuts 71 to lugs 72 on the front of the members 65. Thus, by adjusting the nuts 71 the level of the bottom of the spatula plate 65$^e$ may be adjusted to the desired degree.

While the hopper is shown with all its sides inclined, in some cases where the space is limited, and it is desirable to have the wall built near to the scaffolding, the sides of the hopper longitudinal of the wall may be vertical.

What I claim as my invention and desire to secure by Letters Patent of the United States is:—

1. In apparatus for laying bricks and the like in building, a carriage adapted to travel parallel with the face of the wall to be built, a tray on said carriage for reception of the bricks to be laid, a manually movable transfer device connected by links to said carriage for limited swinging movement from a picking up to a depositing position and vice versa, and manually operated means carried by said transfer device for gripping the bricks on the tray and releasing them at the depositing position.

2. Apparatus according to claim 1, in which the transfer device comprises a fixed abutment, two arms movable towards and away from said abutment and a swivel link arranged transversely to and pivotally connected to said movable arms, said link being manually movable to operate the movable arms.

3. Apparatus embodying a transfer device as claimed in claim 1, a carriage adapted to travel parallel with the face of the wall to be built, means for mounting the transfer device on the carriage for adjustment therein horizontally at right angles to its transfer movement and means for securing it in adjusted position.

4. Apparatus embodying a transfer device as claimed in claim 1, a carriage adapted to travel parallel with the face of the wall to be built, and a frame connected to the transfer device and supported by the carriage so as to be adjustable in height relatively to said carriage.

5. Apparatus embodying a transfer device as claimed in claim 1, a carriage adapted to travel parallel with the face of the wall to be built, a frame connected to the transfer device and supported by the carriage, and means for connecting the frame to the carriage for vertical adjustment thereon comprising a vertical screwed rod on the carriage and a nut thereon in the form of a hand wheel adapted to engage the frame to raise and lower the latter.

6. Apparatus embodying a transfer device as claimed in claim 1, a carriage adapted to travel parallel with the face of the wall to be built, a frame connected to the transfer device and supported by the carriage, a tray adjustably supported by said frame, and adapted for initial support of the bricks prior to their transfer, and means on said tray for the preliminary location of the bricks.

7. Apparatus embodying a transfer device as claimed in claim 1, a carriage adapted to travel parallel with the face of the wall to be built, and a frame connected to the transfer device and supported by the carriage so as to be adjustable in height relatively to said carriage, said frame being designed for detachable connection to a part mounted for vertical adjustment on the carriage.

8. Apparatus embodying a transfer device as claimed in claim 1, a carriage adapted to travel parallel with the face of the wall to be built, a frame connected to the tranfer device and supported by the carriage and means, carried by said frame for automatically removing superfluous mortar from the face of the wall during travel of the carriage and for applying such mortar to the brick last laid for the succeeding joint.

9. Apparatus embodying a carriage adapted to travel parallel with the face of the wall to be built, a brick transfer device supported on said carriage for conveying the bricks from an initial support to their final position and a device for laying mortar on said bricks, comprising a hopper for containing the mortar and adapted to be mounted on said carriage in lieu of the transfer device to travel over the course on which the mortar is to be laid, and a spatula or spreading device supported by said hopper adjacent one or both sides of the lower end of the hopper.

10. Apparatus according to claim 9, in which the spatula is adjustable in height relatively to the hopper.

11. Apparatus according to claim 9, in which the hopper is mounted on a carriage for adjustment in height relatively to said carriage.

12. In apparatus according to claim 9, with trimming devices associated with the hopper and adapted to trim the edges of the layer of mortar flush with the sides of the course on which the mortar is laid, 13. In apparatus according to claim 9, means for adjusting the outlet orifice of the hopper, for the purpose described.

14. In apparatus according to claim 9, means for adjusting the outlet orifice of the hopper, comprising a base embodying a plurality of removable sections adapted to be positioned so that the mortar is deposited in one or more streams of a width or widths corresponding with the kind of wall to be built.

15. In apparatus according to claim 9, means for assisting the flow of the mortar from the hopper, comprising a central shaft mounted inside the hopper at its lower end, paddles or the like rigidly attached to said shaft, and designed to rock through the upper portion of a circle, and means for operating said shaft so that the mortar is brought down to the discharge orifice and assisted out of the hopper.

16. In apparatus for laying bricks and the like in building, a carriage adapted to travel parallel with the face of the wall to be built, a tray on said carriage for reception of the bricks to be laid, a manually movable transfer device connected by parallel links on each side thereof to said carriage for limited swinging movement from a picking up to a depositing position and vice versa, and manually operated means carried by said transfer device for gripping the bricks on the tray and releasing them at the depositing position.

In witness whereof I have signed this specification.

GEORGE EDWARD WIGHT.